United States Patent [19]

Holt

[11] 4,095,762
[45] Jun. 20, 1978

[54] GN₂ ACCUMULATOR POWERED SHAFTLESS PISTON FOR DEPENDENT DUAL EJECTOR BOMB RACK

[75] Inventor: Lloyd J. Holt, Ridgecrest, Calif.

[73] Assignee: The United States of America as represented by the Secretary of the Navy, Washington, D.C.

[21] Appl. No.: 816,418

[22] Filed: Jul. 18, 1977

[51] Int. Cl.² .............................................. B64D 1/04
[52] U.S. Cl. ................................ 244/137 R; 89/1.5 F
[58] Field of Search ............. 244/137 R; 294/83 AE, 294/83 R; 89/1.5 R, 1.5 C, 1.5 F, 1.5 G, 1.5 H; 92/138, 151, 5 L, 100, 31, 27, 33, 28, 29; 60/581, 579; 91/411 A, 375 R, 391 R

[56] References Cited

U.S. PATENT DOCUMENTS

| 1,000,784 | 8/1911 | Cummings | 92/138 |
|---|---|---|---|
| 2,793,876 | 5/1957 | Allwes | 60/581 |
| 3,433,133 | 3/1969 | Brewer et al. | 92/100 |
| 3,709,106 | 1/1973 | Shafer | 92/138 |
| 3,753,386 | 8/1973 | Scott | 92/5 |
| 3,786,728 | 1/1974 | Sheesley et al. | 92/138 |
| 3,797,324 | 3/1974 | Sheesley et al. | 92/138 |
| 3,799,478 | 3/1974 | Costes et al. | 244/137 R |
| 3,936,019 | 2/1976 | Craige | 244/137 R |
| 3,974,990 | 8/1976 | Holt et al. | 244/137 R |

FOREIGN PATENT DOCUMENTS

| 1,252,164 | 11/1971 | United Kingdom | 92/138 |
|---|---|---|---|

*Primary Examiner*—Galen L. Barefoot
*Attorney, Agent, or Firm*—R. S. Sciascia; Roy Miller

[57] ABSTRACT

A stores ejection system incorporating a dual piston system for power actuation of the ejectors and having a linkage for transfer of power between the pistons which does not penetrate the end walls of the operating cylinder but is pinned to a boss on one of the pistons.

4 Claims, 3 Drawing Figures

GN₂ ACCUMULATOR POWERED SHAFTLESS PISTON FOR DEPENDENT DUAL EJECTOR BOMB RACK

BACKGROUND OF THE INVENTION

1. Field of the Invention

The present invention relates to a stores ejection apparatus for ejecting stores such as missiles, bombs or the like from an aircraft.

2. Description of the Prior Art

The prior art is exemplified in U.S. Pat. No. 3,974,990 which discloses a dual ejector stores attitude control system. The extendable store ejectors are hydraulically actuated and dependently connected for positive control and the degree of extention of each injector is independently adjustable. The extendable ejectors may be either connected together by mechanical or hydraulic linkage.

As shown in FIG. 1 of the patent, the ejector assemblies 12 and 14 with their input pistons incorporate a connecting linkage 18, 20 which mechanically connects the gas power system output piston 22 with the aforesaid input pistons. The system has three pistons which are therefore movement dependent.

The present invention replaces the three movement dependent pistons with two pistons which are contained within a single cylindrical tube. However, the two pistons are movement dependent by incorporating a linkage external of the cylinder which connects the two pistons.

SUMMARY OF THE INVENTION

The dual ejector system incorporates a single cylindrical member which contains a shaftless piston at one end thereof and another piston at the other end thereof which are interlinked by a mechanical linkage external to the cylinder containing the two pistons. The face of each of the pistons is in open communication with one of a respective pair or hydraulically actuated ejectors. The two pistons are separated within the cylinder by a barrier which comprises a portion of one of the ejectors. The shaftless piston has a hollow interior which forms a pressure chamber for a souce of high-pressure hydraulic fluid such as nitrogen.

The pistons are initially cocked and held in the cocked position by a safety catch and the hollow portion of the shaftless portion pressurized to the desired pressure. Upon release of the safety catch when ejection of the store is desired, the two pistons move linearly in the cylinder in the same direction due to the physical inter-connection by the external linkage. Hydraulic fluid in communication with the face of each piston is forced into a respective hydraulically actuated ejector.

DESCRIPTION OF THE PREFERRED EMBODIMENTS

Figure 1:
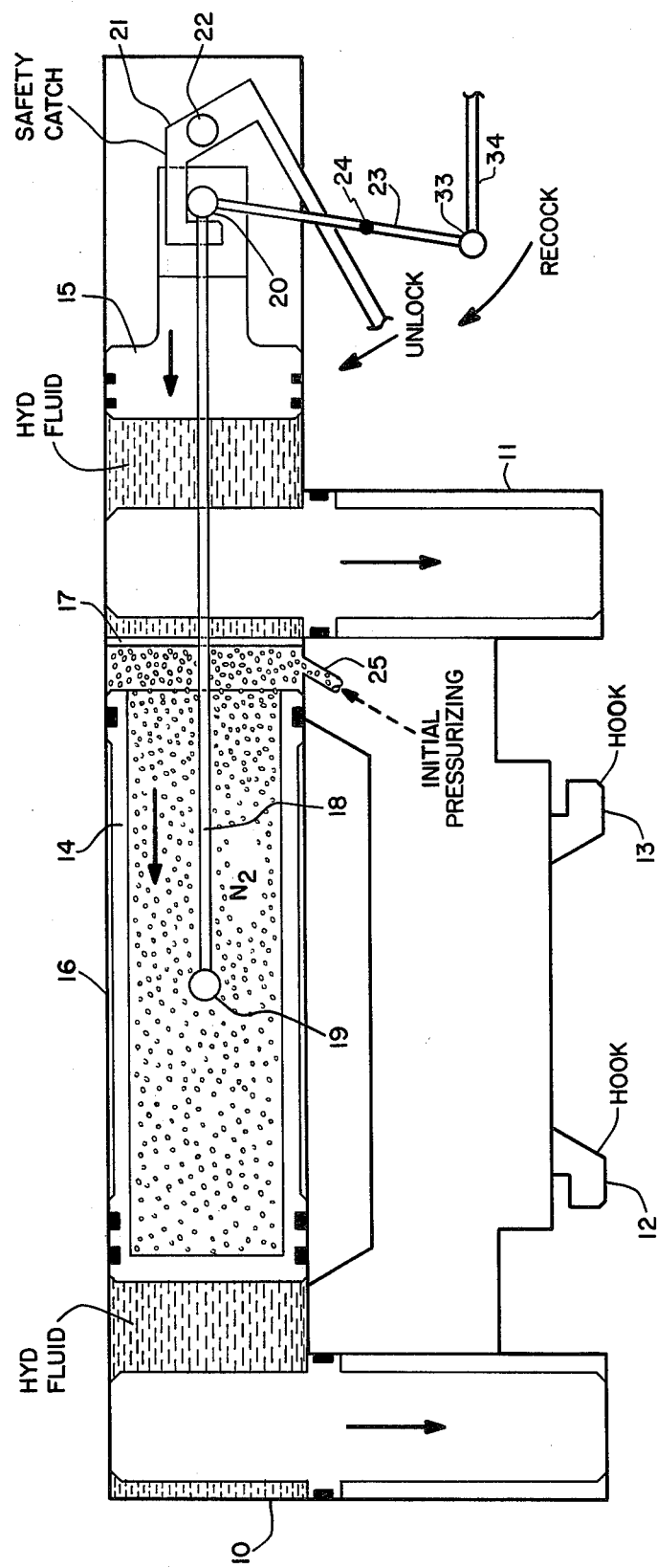
FIG. 1 is a schematic representation of a dual ejector apparatus.

FIG. 1 is a schematic outline of the dual ejection apparatus with fore and aft ejectors 10 and 11 and fore and aft hooks 12 and 13 which are used to retain the store on the ejection rack. The ejectors 10 and 11 incorporate hydraulically actuated pistons which are caused to move under the influence of hydraulic fluid contained between the face of a shaftless piston 14 and another piston 15 respectively.

The two pistons 14 and 15 are contained within a substantially cylindrical member 16 which is partitioned by an impermeable barrier 17 which is actually part of the aft ejector 11. The two pistons 14 and 15 are mechanically interlinked by a linkage mechanism 18 one end of which is connected to an exterior boss 19 on the shaftless piston 14 and the other end of which is connected by a pin 20 to the right-hand portion of piston 15 (looking at FIG. 1).

The pistons are restrained in a cocked position by a safety catch 21 which pivots about point 22.

The hollow interior of shaftless piston 14 is initially pressurized by a source of high-pressure gas such as nitrogen or it may be pressurized in flight by using the hydraulic system of the particular aircraft involved. In any event, this system is initially pressurized and held in the cocked position by the safety catch 21. Upon release of the safety catch the pistons 14 and 15 move to the left in FIG. 1 thereby forcing hydraulic fluid into the ejectors 10 and 11 respectively and causing the pistons to eject the store.

The system may be recocked on board the aircraft by use of the linkage 23 pivoting around the point 24, the link 23 being connected to the pin 20, or the system may be left in the uncocked position. Then upon landing the aircraft, the system may be recocked by bleeding off the high-pressure gas and moving the two pistons to the right in FIG. 1.

Figure 2:
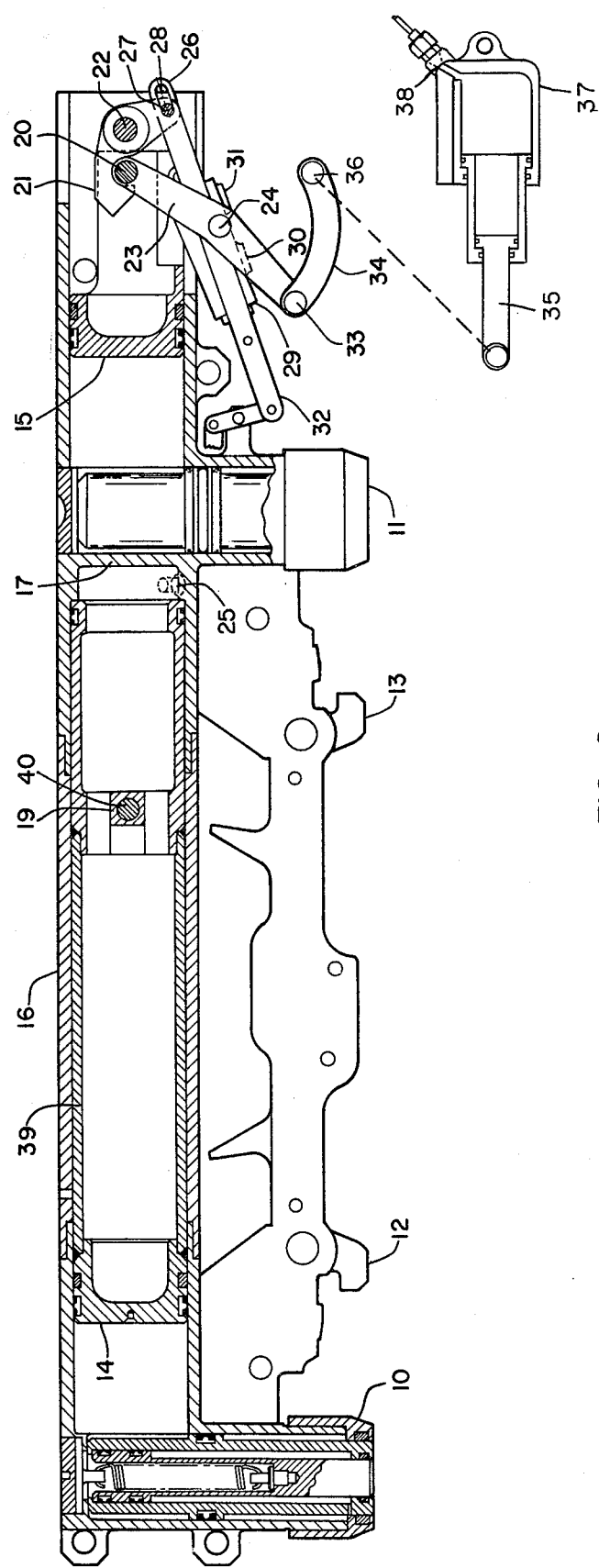
FIG. 2 is a view, partly in cross-section, through the center of the ejection system.

FIG. 2 shows the assembly in greater detail. The ejection mechanism contained within the ejectors 10 and 11 is not explained in detail in that they form no part of the present invention. It is sufficient to say that they comprise spring-biased hydraulic members which are driven downwardly under the influence of hydraulic fluid.

Additional details of the release mechanism for the safety catch 21 however, are shown in FIG. 2 and comprise a link 26 which is restrained by a pin 27 carried by a portion of the safety catch 21. The link 26 is relieved as at 28. The link is fixed to a piston assembly carried within fluid motor 29 which has an exhaust 30 and fluid inlet 31. The fluid motor 29 also has a link 32 extending from the other end thereof which goes to the release mechanism for releasing the hooks 12 and 13. This is not gone into in detail in that the hook release mechanism forms no part of the present invention and might be any suitable linkage to release the hooks 12 and 13.

The recocking mechanism is shown in greater detail in FIG. 2 wherein the arm 23 which pivots about point 24 has another pin 33 to which a link 34 is attached. Link 34 is in turn pinned to one end of a piston 35 as at 36. Piston 35 is contained within a cylinder 37 which is in hydraulic communication as at 38 with a source of hydraulic fluid. The hydraulic fluid source might be either the hydraulic system aboard an aircraft on which the store is carried or a suitable source aboard an aircraft carrier or an air-field.

As can be seen in FIG. 2, piston 14 has a skirt 39 extending for a substantial distance along the interior of the cylindrical member 16. The hollow interior of this skirt forms the container for the high-pressure gas which is used to drive the piston 14 to the left as shown in FIG. 2. Piston 15 also has a portion dependent therefrom to which pin 20 is attached as shown in FIG. 2.

Figure 3:
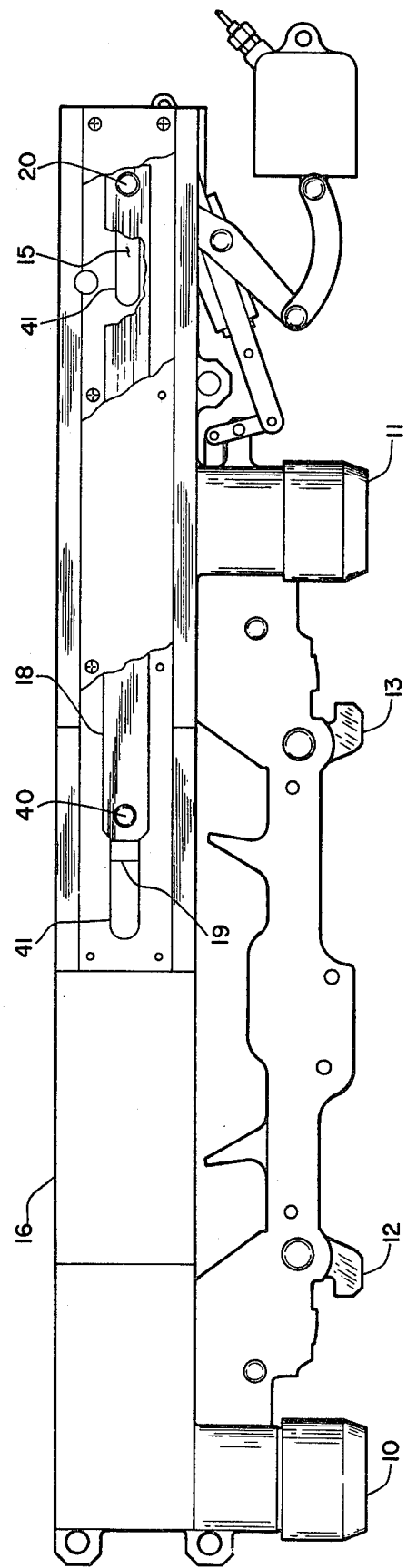
FIG. 3 is a side view of the system showing the external mechanical linkage.

FIG. 3 shows the outside of the assembly and particularly the boss 19 to which link 18 is connected by pin 40. The outer member 16 is relieved as at 41 to accomodate the movement of boss 19 and pin 40.

DESCRIPTION AND OPERATION

In operation, the mechanism is initially in the cocked position. A source of high-pressure gas such as nitrogen is connected at input 25 and the interior of the shaftless piston 14 is pressurized. Now it is to be understood that the system may be pressurized either on the deck or in the air if the aircraft hydraulic system is used. In any event, the system is held in a cocked position until fluid motor 29 causes link 26 to retract. There is a slight delay caused by the relief portion 28 so that the hooks 12 and 13 may release prior to initiation of the ejectors 10 and 11.

After the slight delay, safety catch 21 rotates around pin 22 and releases pin 20 which allows the high-pressure gas to force the shaftless piston 14 and interconnected piston 15 to the left in FIG. 2. Hydraulic fluid contained between the face of the pistons and the respective ejector assemblies is forced into the ejectors 10 and 11 respectively, which causes the piston member carried therein to be moved downwardly in FIG. 2.

At this point, the store is ejected and the ejectors will either remain in the extended position or if the recocking mechanism is connected to the hydraulic fluid system aboard the aircraft the piston 35 in cylinder 37 is driven to the left in FIG. 2 which causes rotation of link 23 about point 24 thereby recocking the system. If there is no source of hydraulic fluid aboard the aircraft to be attached to the input 38 of cylinder 37, the system is recocked once the airplane lands aboard the aircraft carrier or the airfield in much the same way that is, a source of hydraulic fluid is attached to input 38 and the system recocked.

Use of the external linkage 18 between the shaftless piston 14 and the linked piston 15 provides greater flexability in packaging of components in a given space envelope. The shaftless piston also allows the interior thereof to be used as an accumulator or pressure vessel. Use of the shaftless piston with the external linkage also allows weight and space saving, design flexibility for power-in-force-out variations and piston sizing flexability.

What is claimed is:

1. A stores ejecting system adapted to be attached to an aircraft for forcibly ejecting a store attached to the aircraft by releaseable attachment means comprising:
    a pair of physically separated ejectors;
    each of said ejectors being hydraulically actuated;
    substantially cylindrical means physically and operatively connecting the pair or ejectors;
    a shaftless piston contained within said cylindrical means and having a face and a skirt portion;
    said face being in open communication with one of said ejectors;
    another piston contained within said cylindrical means and having a face and a skirt portion;
    said face of said another piston being in open communication with the other of said pair of ejectors;
    an impermeable barrier in said cylindrical means between said shaftless piston and said another piston;
    linkage means external of said cylindrical means operatively connecting the shaftless piston and said another piston;
    a source of high-pressure fluid in communication with the interior of the skirt of the shaftless piston;
    hydraulic fluid contained within a space between each ejector and the face of the shaftless piston and the face of said another piston;
    so that when said high-pressure fluid causes said shaftless piston to move hydraulic is forced into said ejectors by having said shaftless piston and said another piston linked by said linkage means external to said cylindrical means.

2. A stores ejection system as set forth in claim 1 and further including:
    a safety catch operatively connected to one of said shaftless piston and said another to restrain said shaftless piston and said another piston in a cocked position so that the high-pressure fluid cannot cause movement thereof until the safety catch is released.

3. A stores ejection system as set forth in claim 2 and further including:
    unlocking means operatively connected to said safety catch for unlocking the safety catch and allowing movement of the shaftless piston and said another piston to cause ejection of stores.

4. A stores ejection system as set forth in claim 2 wherein;
    said safety catch is physically attached to a portion of said another piston.

* * * * *

UNITED STATES PATENT AND TRADEMARK OFFICE
CERTIFICATE OF CORRECTION

PATENT NO. : 4,095,762
DATED : 20 June 1978
INVENTOR(S) : LLOYD J. HOLT

It is certified that error appears in the above–identified patent and that said Letters Patent are hereby corrected as shown below:

In column 4 line 27 insert ---fluid--- between "hydraulic" and "is".

Signed and Sealed this

Sixth Day of February 1979

[SEAL]

Attest:

RUTH C. MASON
Attesting Officer

DONALD W. BANNER
Commissioner of Patents and Trademarks